UNITED STATES PATENT OFFICE.

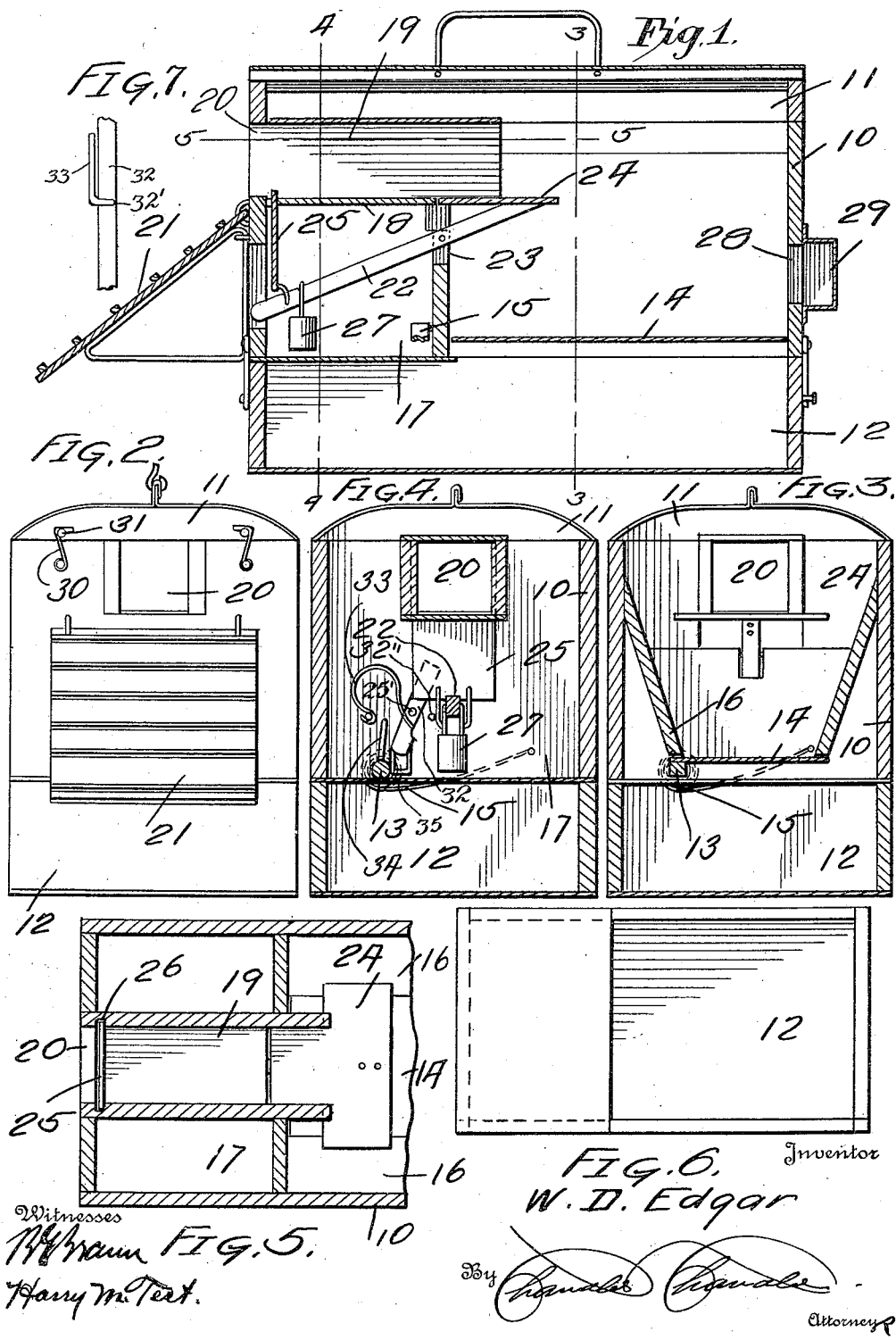

WILLIAM DONALD EDGAR, OF TRENTON, NORTH DAKOTA.

ANIMAL-TRAP.

1,173,495. Specification of Letters Patent. Patented Feb. 29, 1916.

Application filed February 2, 1915. Serial No. 5,676.

*To all whom it may concern:*

Be it known that I, WILLIAM D. EDGAR, a citizen of the United States, residing at Trenton, in the county of Williams, State of North Dakota, have invented certain new and useful Improvements in Animal-Traps; and I do hereby declare the following to be a full, clear, and exact description of the invention, such as will enable others skilled in the art to which it appertains to make and use the same.

This invention relates to improvements in animal traps and particularly to traps for catching rats or mice.

One object of the invention is to provide a simple and novel device of this character whereby the animal will be precipitated into a receptacle of water and drown.

Another object is to provide a device of this character in which the preliminary trip operated by the animal closes the entrance so that the animal can not turn and escape.

A further object is to provide a device of this character in which the trap is automatically set for the next animal when the first animal has been trapped.

Other objects and advantages will be apparent from the following description when taken in connection with the accompanying drawing.

In the drawings: Figure 1 is a vertical longitudinal sectional view through the trap made in accordance with my invention, Fig. 2 is an end elevation of the same, Fig. 3 is a vertical section on the line 3—3 of Fig. 1, Fig. 4 is a vertical section on the line 4—4 of Fig. 1, Fig. 5 is a horizontal longitudinal sectional view on the line 5—5 of Fig. 1, and Fig. 6 is a plan view of the water receptacle, the inclosure being removed. Fig. 7 is an enlarged detail view of the latch member.

Referring particularly to the accompanying drawing, 10 represents a suitable inclosure, preferably in the form of a box, the same being open at the top and bottom, and having a removable lid 11 secured over the top and a receptacle 12 detachably secured to the bottom and adapted to contain water. Extending longitudinally at one side of the bottom of the inclosure 10 is a shaft 13 to which is secured one long marginal edge of a trip platform 14, a spring 15 being secured at one end to the shaft and wound thereon and having its other end secured to one side of the inclosure. The spring is normally under tension to hold the platform in elevated or horizontal position, and when the platform is depressed the tension is increased on the spring so that after the trap door is released the spring will return the same to normal horizontal position. The inner faces of the longer sides of the inclosure incline downwardly and inwardly as clearly shown at 16. In the forward portion of the inclosure is an inclosed chamber 17, the upper wall 18 of which forms the floor of an entrance channel 19, access being gained to said channel through the opening 20 in the forward end of the inclosure. To permit the animal to readily reach the opening 20 an inclined board 21 is provided and has its upper end just below the opening 20. A longitudinally extending lever 22 extends through an opening 23 in the rear wall of the chamber 17 and is pivotally mounted on said wall. The rear end of this lever carries a horizontal platform 24 which normally is disposed in the same plane as the floor 18 inwardly of the inner end thereof and over the tilting platform 14. The other end of the lever is pivotally connected to a vertical sliding door 25 mounted in suitable guides 26 in the forward end of the inclosure and adapted to push said door upwardly to close the opening 20 when the platform 24 is depressed. A weight 27 is carried by the lever within the chamber 17 which normally tilts the lever into position to hold the platform 24 elevated and the door 25 lowered.

Pivotally mounted on the pin 25' supported by the front wall of the inclosure is a pivoted sheet metal latch member 32 which is engaged by the offset 32' formed on one end of a bowed spring 33, said spring having its other end secured to the said front wall. The movement of the member 32 is limited in one direction by the pin 32'' supported by the adjacent end of the closure, the movement in the reverse direction being limited by the bracket 35, which is connected to the lower end of the member, upon engagement with the shaft 13. This latch is adapted to be forced under the lever 22 when the door is moved into upward or closed position upon the depression of the platform 24, whereby the door is prevented from moving down. On the shaft 13 is a radially extending pin 34 which engages with the latch member 33 below the pivot thereof upon rocking movement of said shaft when the platform 14 is depressed. In the rear end of the inclosure is an opening 28 and detachably secured to the rear wall of the inclosure outwardly of the opening is a receptacle 29 in which bait is adapted to be placed.

In the position shown in Fig. 1, all the parts are in normal or set position ready for the entrance of an animal. An animal passing up the runway 21 enters through the opening 20 and passes along the channel 19 on to the platform 24 when the weight of the animal will rock the lever 22 downward so that the door 25 will be pushed up to close the opening 20. The platform 24 will be tilted to such an angle that the animal will be precipitated on to the platform 14, which, when it receives the weight of the animal will swing downwardly and throw the animal into the water in the receptacle 12. The cover 11 and receptacle 12 are held in position on the inclosure 10 by means of the hooks and pins 30 and 31 so that access to the inclosure from the top can be had by removing the lid 11 and to remove the receptacle 12 for cleaning and refilling with water. It will thus be seen that when an animal enters the trap and causes the depression of the platform 24 the door 25 will be raised to closed position so that the animal can not escape even though it succeeds in gaining a foothold on the platform and getting back into the passage-way 19. Upon the animal jumping on to the platform 14 for the purpose of seeking another means of escape or in an effort to get the bait in the box 29, the animal will depress the platform and cause the rotation of the shaft 13 and releasing of the latch 32 by the pin 34. Thus the trap is reset for the next animal the first animal being precipitated into the water in the lower chamber 12 and prevented from escape by the closing of the platform 14.

What is claimed is:

In an animal trap, a vertically slidable entrance door, a depressible platform inwardly of the door, a pivoted lever connected to the door and to the platform, a water chamber in the lower portion of the trap, a rock shaft extending longitudinally of the trap, a platform disposed above the water chamber and below the depressible platform, and having one edge fixed to the shaft a spring operated detent mounted below the said entrance door in position to engage the lever to hold the door in closed position upon depression of the second named platform, a pin carried by the shaft adapted to engage the detent to disengage the same from the lever simultaneous with the tilting of the second named platform by the weight of an animal and means for positively rocking the lever to open said door.

In testimony whereof, I affix my signature, in the presence of two witnesses.

WILLIAM DONALD EDGAR.

Witnesses:
J. T. WILKINSON,
JOHN T. WHITTED.

Copies of this patent may be obtained for five cents each, by addressing the "Commissioner of Patents, Washington, D. C."